US 9,404,481 B2

(12) United States Patent
Oikawa et al.

(10) Patent No.: US 9,404,481 B2
(45) Date of Patent: Aug. 2, 2016

(54) HIGH-PRESSURE PUMP

(71) Applicants: DENSO CORPORATION, Kariya, Aichi-pref. (JP); NIPPON SOKEN, INC., Nishio, Aichi-pref. (JP)

(72) Inventors: Shinobu Oikawa, Kariya (JP); Hirokuni Tomita, Okazaki (JP); Takehiko Kato, Nukata-gun (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/943,108

(22) Filed: Nov. 17, 2015

(65) Prior Publication Data

US 2016/0069333 A1 Mar. 10, 2016

Related U.S. Application Data

(62) Division of application No. 13/933,450, filed on Jul. 2, 2013.

(30) Foreign Application Priority Data

Jul. 4, 2012 (JP) .................................. 2012-150697
Mar. 26, 2013 (JP) .................................. 2013-063987

(51) Int. Cl.
F04B 49/22 (2006.01)
F04B 7/00 (2006.01)
(Continued)

(52) U.S. Cl.
CPC ............. F04B 7/0076 (2013.01); F04B 1/0452 (2013.01); F04B 7/02 (2013.01); F04B 19/22 (2013.01); F04B 53/1082 (2013.01); F16K 31/0693 (2013.01)

(58) Field of Classification Search
CPC .. F04B 7/0076; F04B 1/0452; F04B 53/1082; F16K 31/0693

USPC .............................. 417/505, 298; 251/129.07
See application file for complete search history.

(56) References Cited

U.S. PATENT DOCUMENTS 5,810,030 A * 9/1998 Uchiyama ........... F16K 31/0655
137/468
6,345,870 B1 * 2/2002 Linkner, Jr. ............. B60T 8/367
251/129.02

(Continued)

FOREIGN PATENT DOCUMENTS

| JP | 10-205404 | 8/1998 |
| JP | 11-82799 | 3/1999 |
| JP | 2001-304068 | 10/2001 |

OTHER PUBLICATIONS

Office Action (2 pages) dated Oct. 9, 2014, issued in corresponding Japanese Application No. 2013-063987 and English translation (3 pages).

Primary Examiner — Charles Freay
(74) Attorney, Agent, or Firm — Nixon & Vanderhye P.C.

(57) ABSTRACT

Between a movable core chamber and a fuel supply passage, a needle guide slidably supports a needle fixed to a movable core. The needle guide has a communication hole which fluidly connects the movable core chamber and the fuel supply passage. An opening sectional area of the communication hole is defined in such a manner that a fuel discharged amount decreases as an energization start time of a coil is delayed. In a suction stroke, it is restricted that the movable core and the needle bounce toward the fixed core after the needle biases a suction valve toward a stopper by means of a biasing force of a second spring. A relationship between the energization start time of the coil and the fuel discharged amount is properly maintained, so that the fuel discharged amount of the high-pressure pump can be controlled correctly.

5 Claims, 15 Drawing Sheets

(51) Int. Cl.
*F04B 7/02* (2006.01)
*F16K 31/06* (2006.01)
*F04B 1/04* (2006.01)
*F04B 53/10* (2006.01)
*F04B 19/22* (2006.01)

(56) References Cited

U.S. PATENT DOCUMENTS

| | | | |
|---|---|---|---|
| 6,729,553 B1 | 5/2004 | Hlousek | |
| 7,959,128 B2 * | 6/2011 | Hoppe | F01L 1/3442 251/129.07 |
| 8,801,398 B2 * | 8/2014 | Korenblik | F04D 17/122 310/90 |
| 2003/0164161 A1 | 9/2003 | Usui et al. | |
| 2006/0239846 A1 * | 10/2006 | Oda | F02M 59/464 417/505 |
| 2009/0120412 A1 * | 5/2009 | Tokuo | F02M 59/102 123/506 |
| 2009/0178652 A1 | 7/2009 | Yamada et al. | |
| 2012/0093670 A1 * | 4/2012 | Usui | F02M 63/0017 417/505 |
| 2013/0327973 A1 | 12/2013 | Maier | |
| 2014/0010687 A1 | 1/2014 | Oikawa et al. | |

* cited by examiner

FIG. 9 COMPARATIVE EXAMPLE
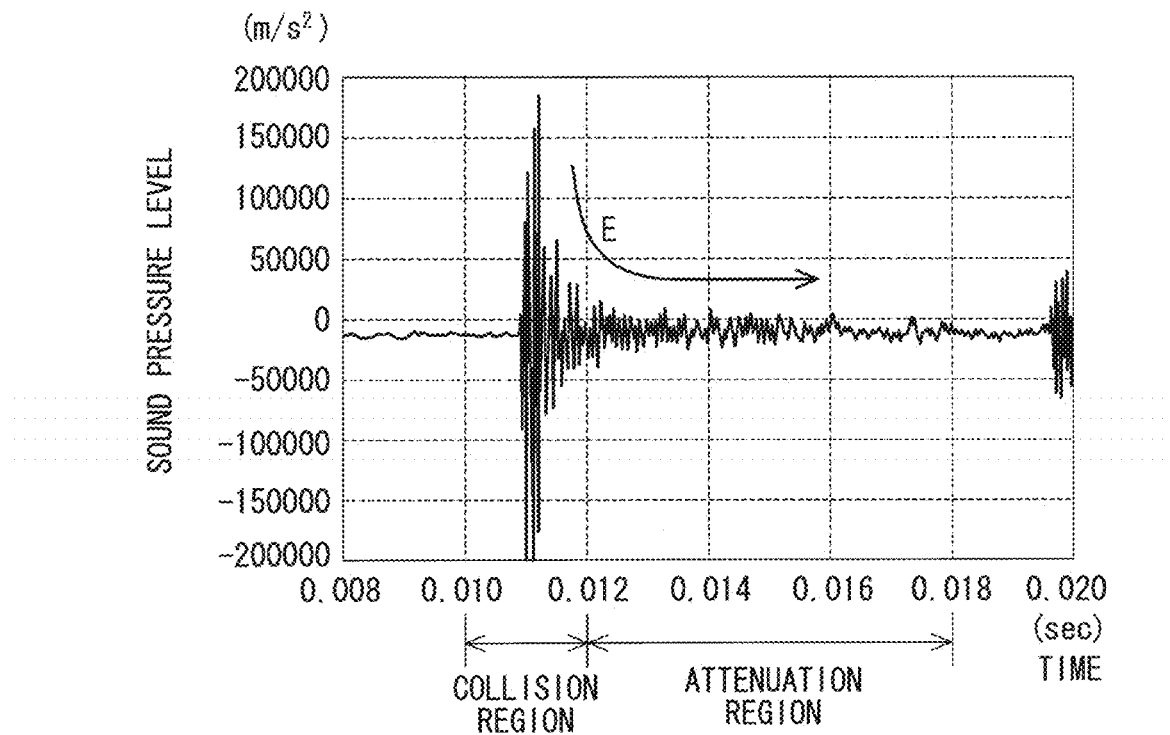
FIG. 10
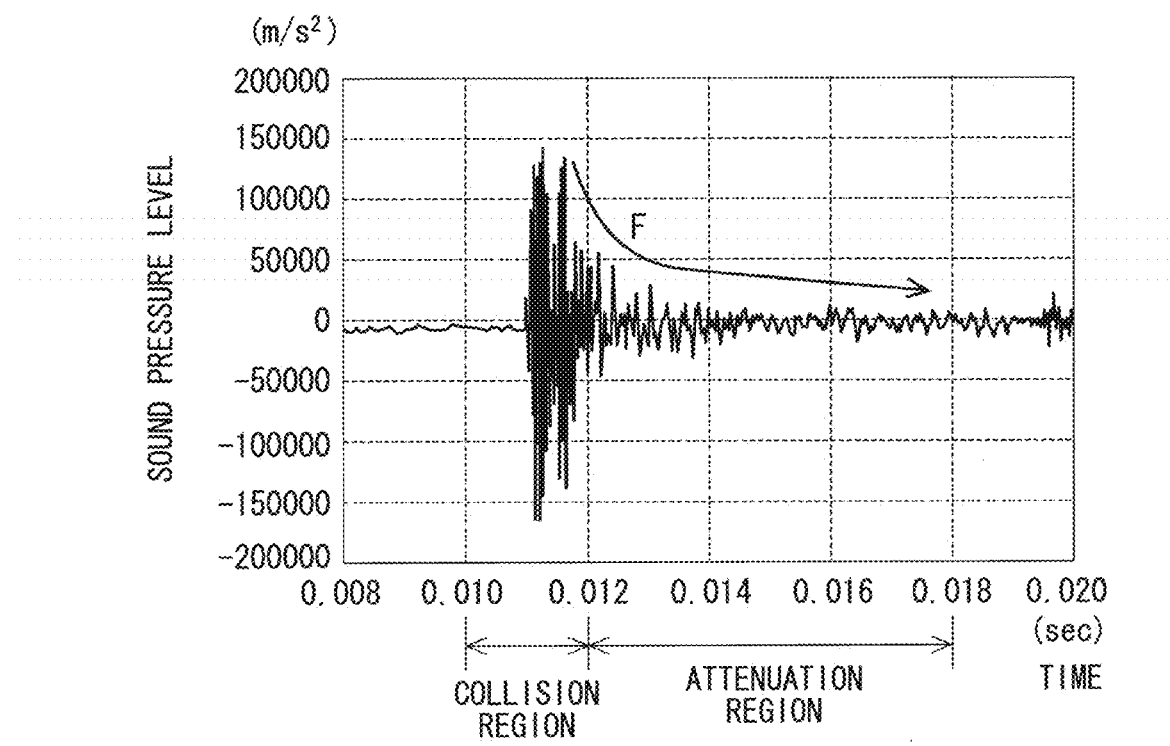

COMPARATIVE EXAMPLE

HIGH-PRESSURE PUMP

CROSS-REFERENCE TO RELATED APPLICATION

This is a divisional of Ser. No. 13/933,450, filed Jul. 2, 2013, which is based on Japanese Patent Applications No. 2012-150697 filed on Jul. 4, 2012, and No. 2013-063987 filed on Mar. 26, 2013, the disclosures of each of which are incorporated herein by reference.

TECHNICAL FIELD

The present disclosure relates to a high-pressure pump.

BACKGROUND

A fuel supply system which supplies fuel to an engine is equipped with a high-pressure pump which pressurizes the fuel suctioned from a fuel tank. A high-pressure pump has a plunger which pressurizes the fuel introduced into a pump chamber through a fuel inlet and a fuel supply passage. The pressurized fuel is discharged through a fuel outlet.

JP-2001-304068A shows a high-pressure pump having a needle valve fixed to a movable core. The needle valve sits on or moves apart from a valve seat to close or open the fuel supply passage. The needle valve is supported by a needle guide which is arranged between a movable core chamber and the fuel supply passage. The needle guide has a communication hole which fluidly connects the movable core chamber and the fuel supply passage. Thereby, a movable core chamber functions as a damper chamber, so that a noise due to a collision between the needle valve and the valve seat can be reduced.

In the above high-pressure pump, as an opening sectional area of the communication hole is made larger, a flow resistance of the fuel flowing through the communication hole becomes smaller and the operation and a movement of the movable core become quicker.

Thus, in a suction stroke of the high-pressure pump, after the movable core and the needle valve collide with a stopper by a biasing force of a spring, it is likely that the movable core and the needle valve may bounce toward a fixed core. At this moment, when the movable core and the needle valve are magnetically attracted to the fixed core in a metering stroke, a valve-close time of the needle valve is made earlier, so that a discharging stroke starts earlier than an intended time. Even if an energization start time of a coil is made later, the fuel discharge quantity is increased. It may be difficult to control the fuel discharge quantity with high accuracy.

SUMMARY

It is an object of the present disclosure to provide a high-pressure pump capable of controlling its fuel discharge quantity with high accuracy.

According to a high-pressure pump of the present disclosure, a movable core chamber and a fuel supply passage are defined by a needle guide. The needle guide has a communication hole fluidly connecting the movable core chamber with the fuel supply passage. An opening sectional area of the communication hole is defined so that a fuel discharged amount decreases as an energization start time of the coil is delayed.

A fuel flow from the fuel supply passage to the movable core chamber is adjusted according to the opening sectional area of the communication hole, so that an operation of the movable core can be controlled. Thereby, in the suction stroke, it is restricted that the movable core and the needle bounce toward the fixed core after the needle biases the suction valve toward stopper by means of a biasing force of a biasing portion. Therefore, the relationship between the energization start time of the coil and the fuel discharged amount is properly maintained. The fuel discharged amount of the high-pressure pump can be controlled correctly.

BRIEF DESCRIPTION OF THE DRAWINGS

The above and other objects, features and advantages of the present disclosure will become more apparent from the following detailed description made with reference to the accompanying drawings. In the drawings:

FIG. 9 is a graph showing a sound pressure level of a time when a solenoid valve is energized, according to a comparative example;

FIG. 10 is a graph showing a sound pressure level of a time when a solenoid valve is energized, according to the first embodiment;

DETAILED DESCRIPTION

Multiple embodiments will be described with reference to accompanying drawings.

First Embodiment

Referring to FIGS. 1 to 14, a first embodiment will be described. A high-pressure pump 1 is provided to a fuel-supply system which supplies fuel to an internal combustion engine. The fuel pumped up from a fuel tank is pressurized by the high-pressure pump 1. The pressurized fuel is accumulated in a delivery pipe. Then, the high-pressure fuel accumulated in the delivery pipe is injected into each cylinder of the engine through a fuel injector.

(Configuration of High-Pressure Pump and Electromagnetic Valve)

Figure 1:
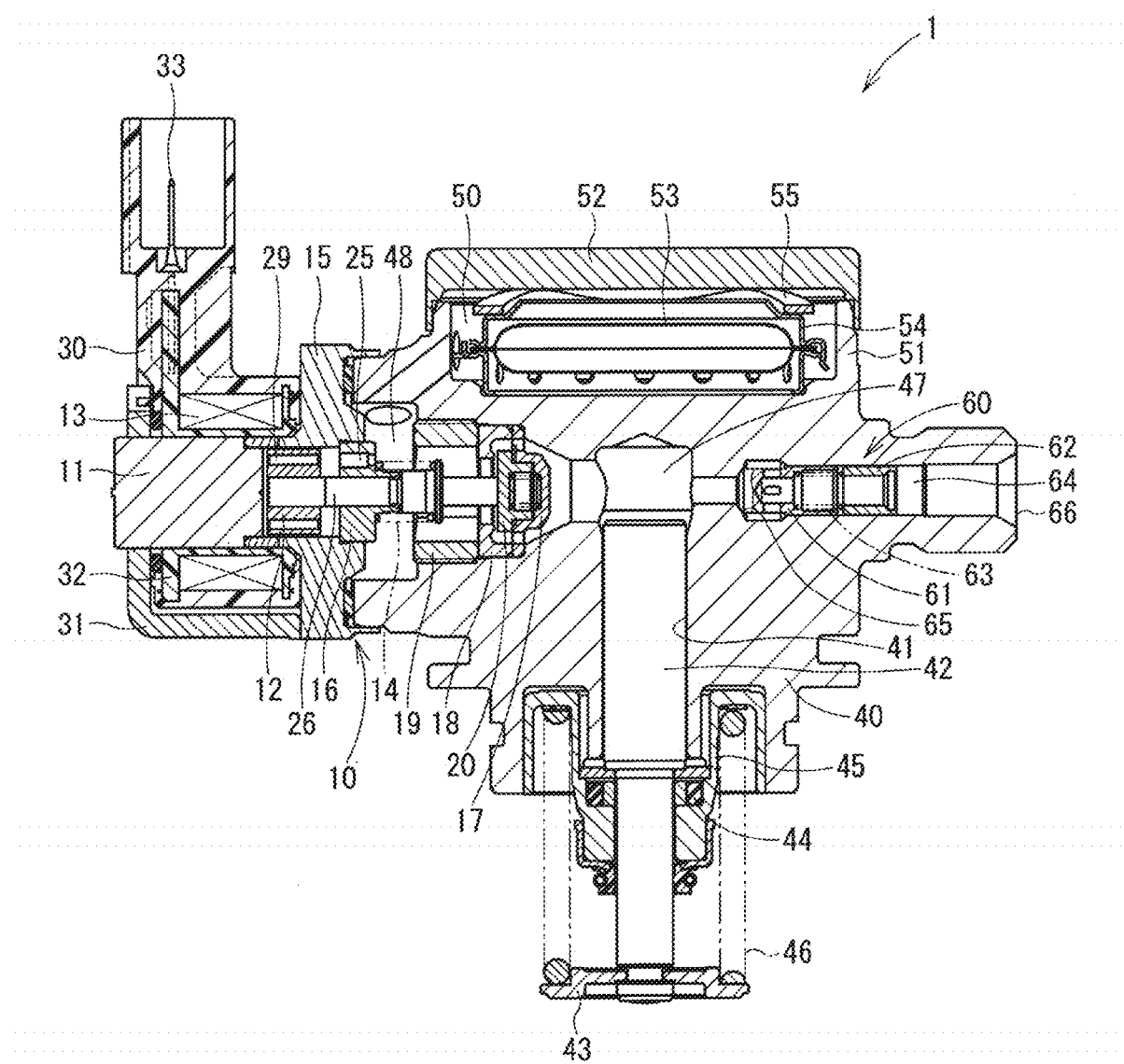
FIG. 1 is a cross-sectional view showing a high-pressure pump according to a first embodiment.

As shown in FIG. 1, the high pressure pump 1 is provided with a pump body 40, a plunger 42, a damper chamber 50, a solenoid valve 10, and a discharge valve 60. The pump body 40 forms a cylinder 41 therein. The cylinder 41 receives the plunger 42 reciprocatably. A spring 46 is arranged between a spring seat 43 and an oil-seal holder 45. The spring seat 43 is disposed to a tip end of the plunger 42. The oil-seal holder 45 holds an oil seal 44 on an outer circumference of the plunger 42. The spring 46 biases the plunger 42 toward a camshaft (not shown) of the engine. The plunger 42 reciprocates in its axial direction according to a cam profile of the camshaft. When the plunger 42 reciprocates, a volume of the pump chamber 47 varies, so that the fuel is introduced into the pump 47 and is pressurized therein.

Next, the damper chamber 50 will be described in detail.

The pump body 40 has a cylindrical portion 51 protruding opposite to the cylinder 41. A cover 52 is provided on the cylindrical portion 51 to define the damper chamber 50. The damper chamber 50 accommodates a pulsation damper 53, a supporting member 54, and a wavy spring 55. The pulsation damper 53 is comprised of two metallic diaphragms in which air of specified pressure is sealed. The pulsation damper 53 reduces fuel pressure pulsation in the damper chamber 50.

The damper chamber 50 communicates with a fuel inlet (not shown) through a fuel passage (not shown). The fuel in a fuel tank (not shown) is supplied to the fuel inlet. The fuel in the fuel tank is introduced into the damper chamber 50 through the fuel inlet.

Next, the solenoid valve 10 will be described in detail.

Figure 2:
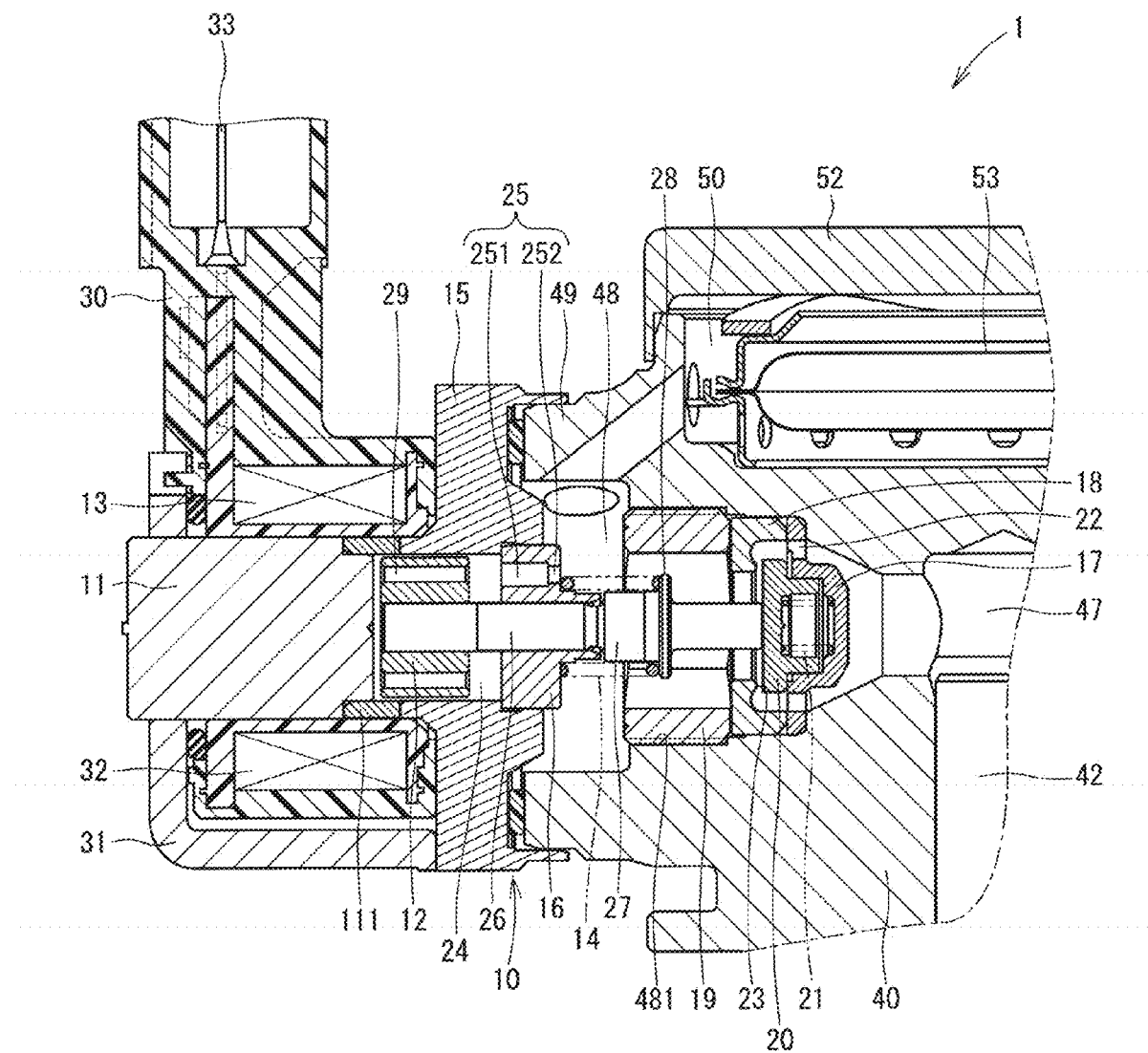
FIG. 2 is an enlarged view of an essential part of FIG. 1.
Figure 3:
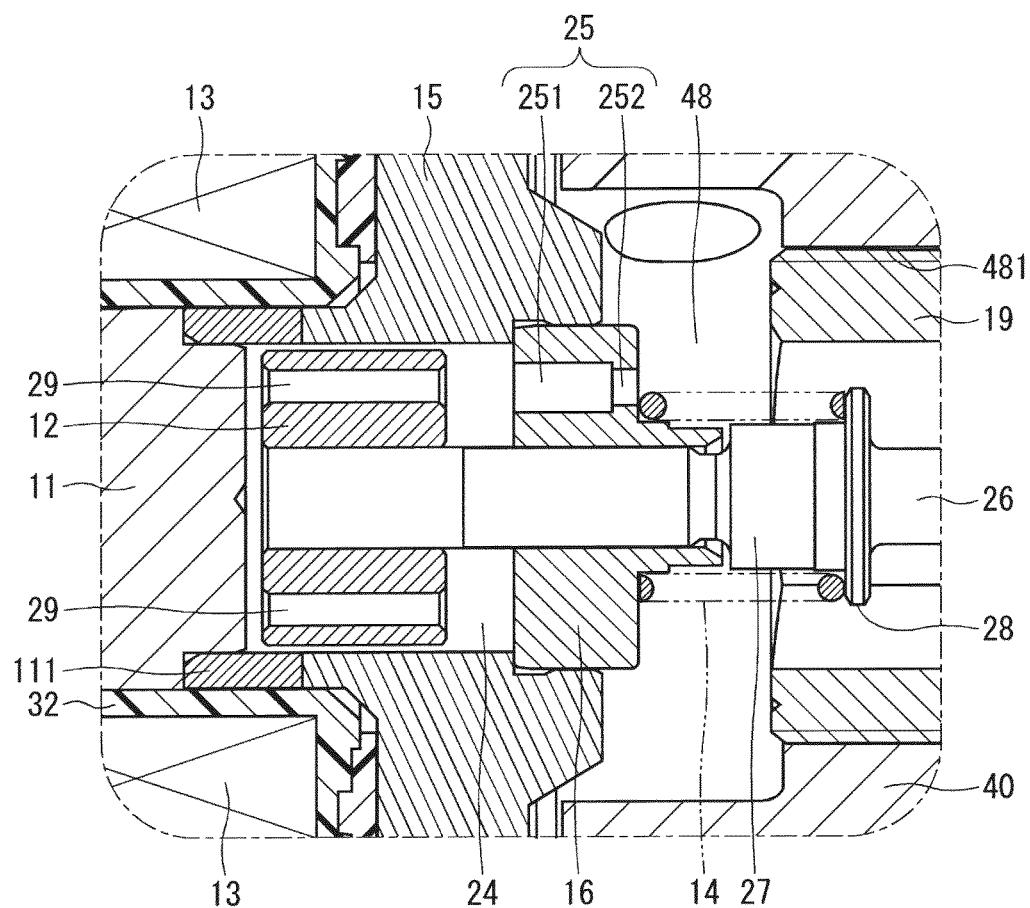
FIG. 3 is an enlarged view of an essential part of FIG. 2.

As shown in FIGS. 2 and 3, the solenoid valve 10 is disposed in a fuel supply passage 48 which connects the pump chamber 47 and the damper chamber 50. The fuel supply passage 48 is opened or closed by the solenoid valve 10. The solenoid valve 10 is provided with a fixed core 11, a movable core 12, a coil 13, a second spring 14, a core housing 15 and a needle guide 16.

The pump body 40 has a small-diameter portion 49 which extends perpendicularly relative to a center line of the cylinder 41. An opening of the small-diameter portion 49 is covered with the core housing 15, whereby the fuel supply passage 48 is defined from the damper chamber 50 to a pump chamber 47.

A stopper 17, a seat member 18, and a cylinder member 19 are arranged in the fuel supply passage 48 in this order. The stopper 17 is cup-shaped to accommodate a suction valve 20 therein. The suction valve 20 reciprocates in the cup-shaped stopper 17 and the stopper 17 regulates a movement of the suction valve 20 in a valve-open direction. A first spring 21 is provided between the stopper 17 and the suction valve 20.

The first spring 21 biases the suction valve 20 in a valve-closing direction. The stopper 17 has an aperture 22 through which the fuel flows.

The seat member 18 has an annular valve seat 23 on which the suction valve 20 can sit. When the suction valve 20 sits on the valve seat 23, the fuel supply passage 48 is closed. When the suction valve 20 moves apart from the valve seat 23, the fuel supply passage 48 is opened. The cylinder member 19 is threaded to a female screw 481 formed on an inner wall of the fuel supply passage 48. Thereby, the stopper 17, the seat member 18 and the cylinder member 19 are fixed in fuel supply passage 48.

The needle guide 16 is fixed inside of the core housing 15. The needle guide 16 separates a movable core chamber 24 from the fuel supply passage 48. The movable core 12 is accommodated in the movable core chamber 24. The needle guide 16 has a communication hole 25 which fluidly connects the movable core chamber 24 and the fuel supply passage 48. The communication hole 25 is comprised of a large-diameter hole 251 and a small-diameter hole 252. The large-diameter hole 251 confronts to the movable core chamber 24. The small-diameter hole 252 confronts to the fuel supply passage 48. According to the first embodiment, an inner diameter of the small-diameter hole 252 is 1.2 mm or less. Preferably, the inner diameter is 1.0 mm or less. That is, an opening sectional area of the small-diameter hole 252 is 0.36 $\pi$mm$^2$ or less. Preferably, the opening sectional area is 0.25 $\pi$mm$^2$ or less. The needle guide 16 supports the needle 26 slidably in its axial direction.

One end of the needle 26 is connected to the movable core 12 and the other end can be in contact with the suction valve 20. The needle 26 has an enlarged portion 27 of which outer diameter is larger than that of the other portion. When the needle 26 moves toward the fixed core, the enlarged portion 27 is brought into contact with the needle guide 16. Moreover, the needle 26 has a flange 28. A second spring 22 is provided between the flange 28 and the needle guide 16. The second spring 14 biases the needle 26 with a biasing force which is greater than that of the first spring 21. That is, the second spring 14 biases the movable core 12 in such a manner as to be apart from the fixed core 11.

The movable core 12 is made from magnetic material and is accommodated in the movable core chamber 24 which is defined in the core housing 15. The movable core 12 axially reciprocates in the movable core chamber 24. The movable core 12 has multiple breathing ports 29 which extend in its axial direction. In the first embodiment, an outer diameter of the movable core 12 is 9.7 mm. An outer diameter of the needle 26 is 3.0 mm. It should be noted that the outer diameters of the movable core 12 and the needle 26 are established based on various factors, such as magnetic attraction force or capacity of the high-pressure pump.

The fixed core 11 is made from magnetic material. A ring portion 111 is sandwiched between the fixed core 11 and the core housing 15. When the needle 26 moves toward the fixed core 11 and the enlarged portion 27 is brought into contact with the needle guide 16, a small space is defined between the fixed core 11 and the movable core 12. This small space is referred to as a final gap.

In first embodiment, when the final gap is defined, a distance between the fixed core 11 and the movable core 12 is 0.08-0.16 mm. That is, when the outer diameter of the movable core 12 is 9.7 mm, the volume of a final gap is 1.8818 $\pi$mm$^3$ to 3.7636 $\pi$mm$^3$.

A connector 30 is provided to the fixed core 11. The connector 30 is supported by a cylindrical yoke 31. The yoke 31 is fixed to the core housing 15. A coil 13 is wound around a bobbin 32. When the coil 13 is energized through a terminal 33 of the connector 30, the coil 13 generates a magnetic field.

When the coil 13 is not energized, the movable core 12 and the fixed core 11 are apart from each other due to the biasing force of the second spring 14. The needle 26 moves toward the pump chamber 47 and the needle 38 pushes the suction valve 20, whereby the suction valve 20 is opened. When the coil 13 is energized, a magnetic flux is generated in the magnetic circuit formed by the fixed core 11, the movable core 12, the yoke 31 and the core housing 15. The movable core 12 is magnetically attracted toward the fixed core 11 against the biasing force of the second spring 14. Consequently, the needle 26 relieves a pressing force against the suction valve 20.

Then, the discharge valve 60 will be described hereinafter.

The discharge valve 60 is comprised of a discharge valve body 61, a regulation member 62 and a spring 63. The pump body 40 defines a discharge passage 64 which extends perpendicularly relative to the center axis of the cylinder 41. The discharge valve body 61 is slidably accommodated in the discharge passage 64. The discharge valve body 61 sits on the valve seat 65 to close the discharge passage 64 and moves away from the valve seat 65 to open the discharge passage 64. The regulation member 62 regulates a movement of the discharge valve body 61 toward a fuel outlet port 66. One end of the spring 63 is engaged with the regulation member 62 and the other end is engaged with the discharge valve body 61. The spring 63 biases the discharge valve body 61 toward the valve seat.

When the fuel pressure in the pump chamber 47 is increased and the discharge valve body 61 receives a force greater than a total of the biasing force of the spring 63 and the fuel pressure downstream of the valve seat 65, the discharge valve body 61 moves away from the valve seat 65. The fuel is discharged through the fuel outlet port 66.

Meanwhile, when the fuel pressure in the pump chamber 47 is decreased and the discharge valve body 61 receives a force smaller than the total of the biasing force of the spring 63 and the fuel pressure downstream of the valve seat 65, the discharge valve body 61 sits on the valve seat 65. Thereby, a reverse flow of the fuel from the valve seat 65 toward the pump chamber 47 is avoided.

(Operation of High-Pressure Pump)

An operation of the high-pressure pump 1 will be described hereinafter. In the following description, a time-lag from when the coil 13 is energized until when the movable core 12, the needle 26 or the suction valve 20 moves is not considered.

(1) Suction Stroke

When the plunger 42 slides down from a top dead center toward a bottom dead center, the volume of the pump chamber 47 is increased. The discharge valve body 61 sits on the valve seat 65 to close the discharge passage 64.

Meanwhile, the suction valve 20 receives a differential pressure between the pump chamber 47 and the fuel supply passage 48, whereby the suction valve 20 moves toward the pump chamber 47 against the biasing force of the first spring 21. The suction valve 20 is opened. At this time, since the coil 13 has been deenergized, the movable core 12 and the needle 26 are moved toward the pump chamber 14 by the biasing force of the second spring 14. The movable core 12 and the needle 26 bias the suction valve 20 toward the pump chamber 47. Thus, the suction valve 20 is kept opened. The fuel is suctioned into the pump chamber 47 from the dumper chamber 50 through the fuel supply passage 48.

(2) Metering Stroke

When the plunger 42 slides up from the bottom dead center to the top dead center along with a rotation of the cam shaft, the volumetric capacity of the pump chamber 47 is reduced. At this moment, since the coil 13 has been deenergized, the needle 26 and the suction valve 20 are positioned at the open position by a biasing force of the second spring 14. The fuel supply passage 48 is kept opened. Thus, the fuel in the pump chamber 47 is returned to the dumper chamber 50 through the fuel supply passage 48. The pressure in the pump chamber 47 does not increase.

(3) Pressurization Stroke

While the plunger 42 slides up from the bottom dead center to the top dead center, the coil 13 is energized. The coil 13 generates a magnetic field and a magnetic attraction force is generated between the fixed core 11 and the movable core 12. When the magnetic attraction force becomes greater than a difference between the biasing force of the second spring 14 and the biasing force of the first spring 21, the movable core 12 and the needle 26 move toward the fixed core 11. Thereby, a pushing force of the needle 26 to the suction valve 20 is canceled. The first spring 21 and the low-pressure fuel discharged from the pump chamber 47 bias the suction valve 20 toward the valve seat 23. The suction valve 20 sits on the valve seat 23 to close the fuel supply passage 48.

After the suction valve 20 sits on the valve seat 23, the fuel pressure in the pump chamber 47 increases while the plunger 42 slides up to the top dead center. When the fuel pressure applied to the discharge valve body 61 in the pump chamber 47 becomes greater than a total of the fuel pressure applied to the discharge valve body 61 in the discharge passage 64 and the biasing force of the spring 63, the discharge valve body 61 is opened. Thereby, the high-pressure fuel pressurized in the pump chamber 47 is discharged to the fuel outlet port 66 through the discharge passage 64.

It should be noted that the energization of the coil 13 is stopped in the pressurization stroke. Since the fuel pressure applied to the suction valve 20 in the pump chamber 47 is greater than the biasing force of the second spring 14, the suction valve 20 is kept closed.

The high-pressure pump 1 repeats the above strokes (1) to (3) to pressurize and discharge the fuel which the internal combustion engine requires.

(Reduction of Erosion)

A stress condition in the final gap between the fixed core 11 and the movable core 12 will be explained. The stress condition represents a condition of an end surface of the movable core 12 confronting to the fixed core 11 or an end surface of the fixed core 11 confronting to the movable core 12. These end surfaces receive stresses of erosion generated by cavitation. As bubble collapse strength of the cavitation is larger, the stress is greater.

The bubble collapse strength is expressed by a product of a void fraction and a force which crushes the bubble. The void fraction is a rate of the amount of bubbles relative to the volume of the gap. The bubble crushing force is expressed by fluid acceleration.

(Bubble collapse strength)=(Void fraction (%))×(Fluid acceleration (mm/s$^2$))

As a pressure fluctuation is the gap between the fixed core 11 and the movable core 12 becomes larger, the amount of bubbles is more increased. The pressure fluctuation in the gap is expressed by a following formula (1).

$$\Delta P = (\Delta V/Vo) \times E \quad (1)$$

$\Delta P$: Pressure fluctuation in the gap $\Delta V$: Absolute value of the variation of the volume of a gap at a time when the movable core moves to the fixed core $Vo$: Volume of the gap at a time when the movable core is most apart from the fixed core E: Bulk modulus of the liquid flowing into the gap As the pressure fluctuation ΔP becomes larger, the amount of bubbles in the gap is more increased.

Figure 15:
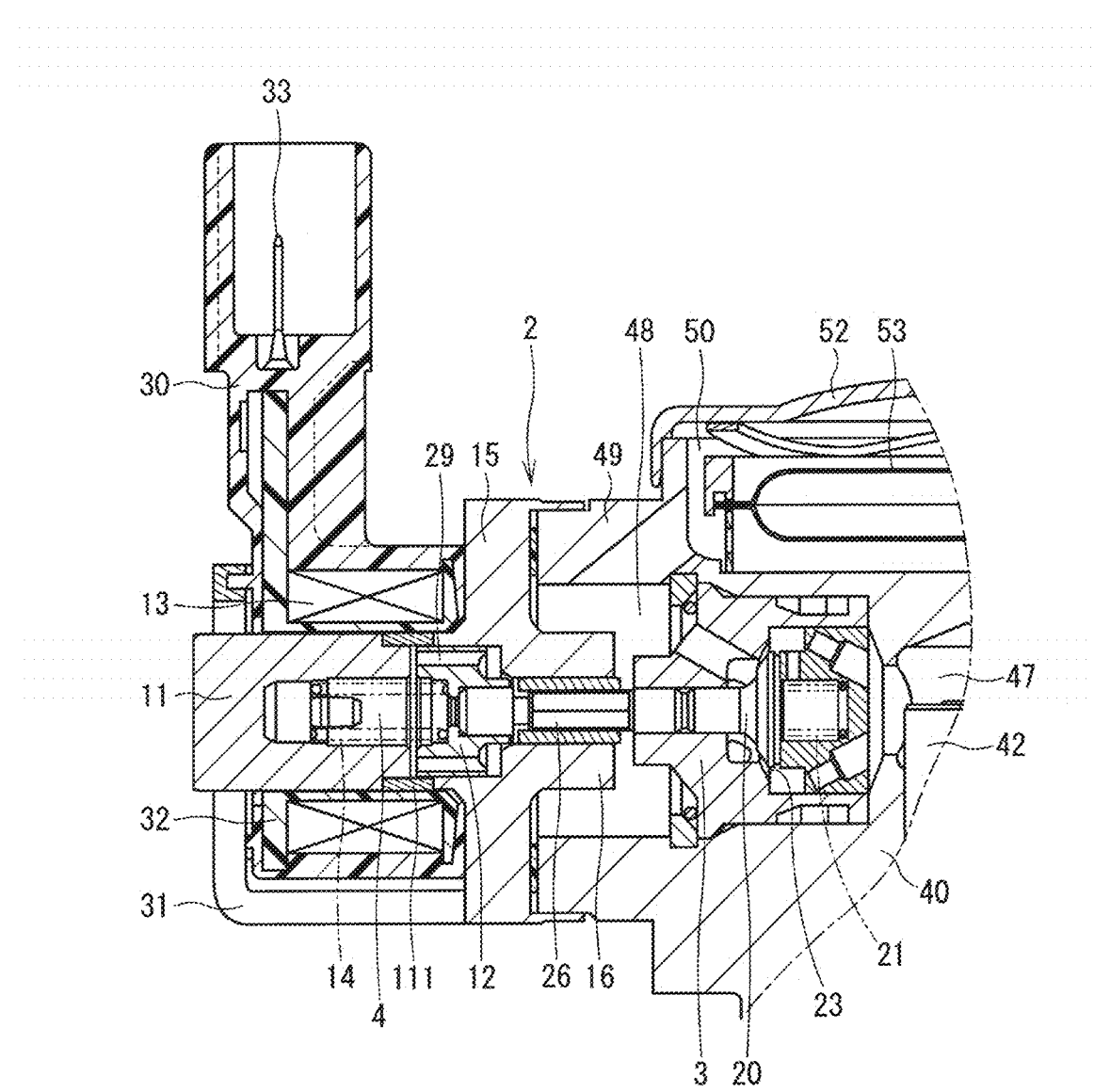
FIG. 15 is a cross-sectional view showing an essential part of a high-pressure pump according to a comparative example.

FIG. 15 shows a comparative example of a high-pressure pump 2. The high-pressure pump 2 is a "solid gap type" pump in which the fixed core 11 and the movable core 12 are brought into contact with each other when the coil 13 is energized. In the following description about the comparative example of the high-pressure pump 2, the substantially same parts and the components as those in the first embodiment are indicated with the same reference numeral and the same description will not be reiterated.

In the high-pressure pump 2, the suction valve 20 and the needle 26 are independently provided in the valve body 3. Unlike the first embodiment, the needle 26 has no enlarged portion. Thus, in the high-pressure pump 2, when the coil 13 is energized, the fixed core 11 and the movable core 12 are brought into contact with each other. The pressure fluctuation in a portion between the fixed core 11 and the movable core 12 becomes larger. The void fraction is increased and the bubble collapse strength becomes larger. As a result, the stress applied to the end surfaces of the movable core 12 and the fixed core 11 becomes larger.

On the other hand, according to the first embodiment, the solenoid valve 10 is an "air gap type" valve in which the movable core 12 is not brought into contact with the fixed core 11. Thus, the pressure fluctuation between the fixed core 11 and the movable core 12 becomes smaller. The void fraction is reduced and the bubble collapse strength becomes smaller.

Referring to analytical data shown in FIGS. 4A to 4D, the stress condition in the gap between the movable core 12 and the fixed core 11 of the solenoid valve 10 of the first embodiment will be described.

Figure 4A:
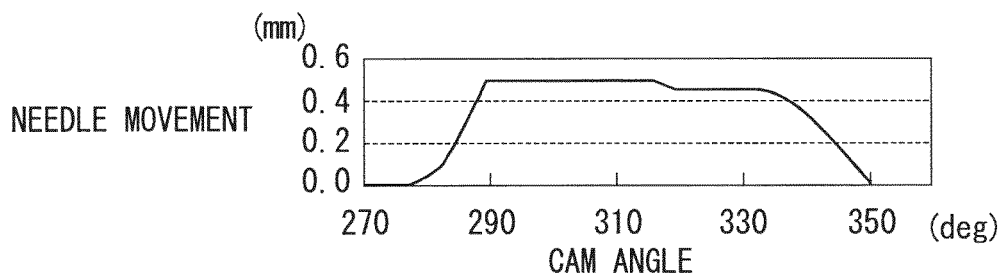
FIGS. 4A to 4D are graphs showing analytical data of stress condition of a gap between a movable core and a fixed core.

FIG. 4A shows a behavior of the needle 26. It should be noted that the needle 26 and the movable core 12 moves together according to the first embodiment. After the cam angle passes 270 (deg), the movable core 12 magnetically attracted toward the fixed core 11 and the needle 26 is also attracted toward the fixed core 11. The enlarged portion 27 and the needle guide 16 are brought into contact with each other when the cam angle is 290 (deg). The needle 26 comes most close to the fixed core 11. Then, while the cam angle is 310 to 330 (deg), the coil 13 is deenergized, so that the needle 26 slightly moves toward the pump chamber 47. While the cam angle is 330 to 350 (deg), the suction valve 20 moves apart from the valve seat 23 and the needle 26 moves toward the pump chamber along with the suction valve 20.

Figure 4B:
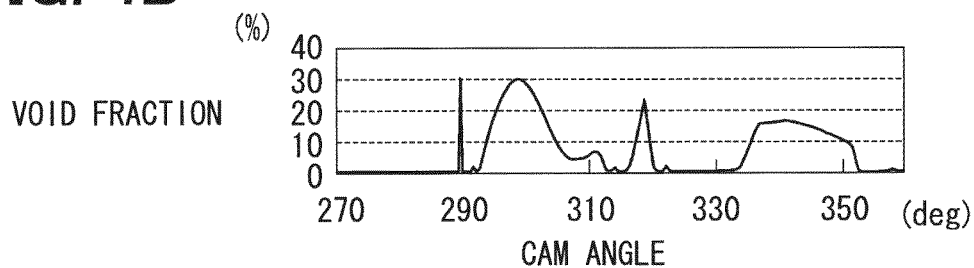

FIG. 4B shows the void fraction in the gap between the movable core 12 and the fixed core 11. While the cam angle is 290 to 350 (deg) and the needle 26 moves toward the fixed core 11, the void fraction significantly varies. An increase and a decrease are repeated.

Figure 4C:
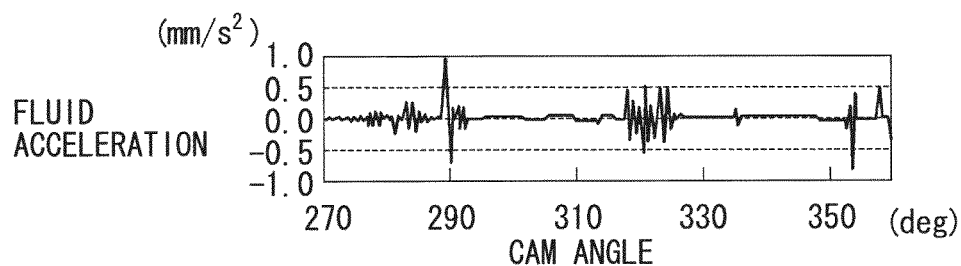

FIG. 4C shows the fluid acceleration of the fuel flowing through the breathing ports 29 of the movable core 12. When the needle 26 comes most close to the fixed core 11 at the cam angle of 290 (deg), the fluid acceleration becomes large. Also, while the coil 13 is deenergized at the cam angle of 310 to 330 (deg), the fluid acceleration becomes large.

Figure 4D:
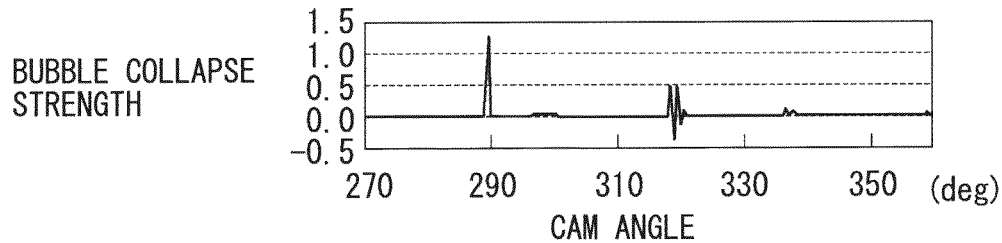

FIG. 4D shows the bubble collapse strength in the gap between the movable core 12 and the fixed core 11. The bubble collapse strength becomes the largest value when both the void fraction and the fluid acceleration become large at the cam angle of 290 (deg). Also, when both the void fraction and the fluid acceleration become large at the cam angle of 310 to 330 (deg), the bubble collapse strength becomes large.

From the above analytical data shown in FIGS. 4A to 4D, it is apparent that the bubble collapse strength in the gap between the movable core 12 and the fixed core 11 is largest when both of the void fraction and the fluid acceleration became large.

Figure 5:
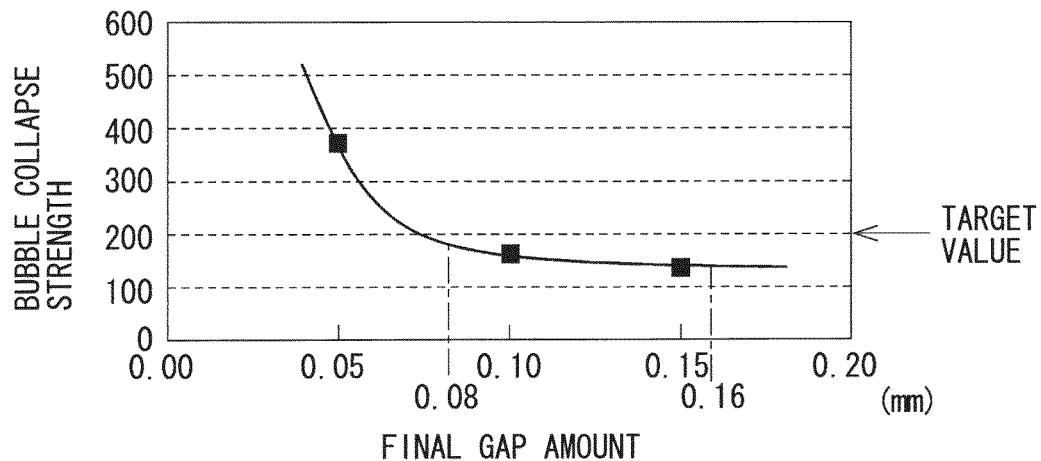
FIG. 5 is a graph showing a relationship between a bubble collapse strength and a final gap amount between the movable core and the fixed core.

Referring to the analytical data shown in FIG. 5, a relationship between a final gap amount and the bubble collapse strength in the final gap will be explained.

In a case that a target value of the bubble collapse strength is set to 200 or less, the target value can be obtained when the final gap amount is 0.8 mm or more. However, when the final gap amount is 0.16 mm or more, it is likely that the magnetic attraction force between the movable core 12 and the fixed core 13 may be decreased. Therefore, the final gap amount is established at the value of 0.08 to 0.16 mm. When the outer diameter of the movable core 12 is 9.7 mm, the volume of the final gap is 1.8818 πmm$^3$ to 3.7636 πmm$^3$.

Referring to the analytical data shown in FIG. 6, a relationship between a cross-sectional area of the communication hole 25 and the bubble collapse strength in the final gap will be explained.

Figure 6:
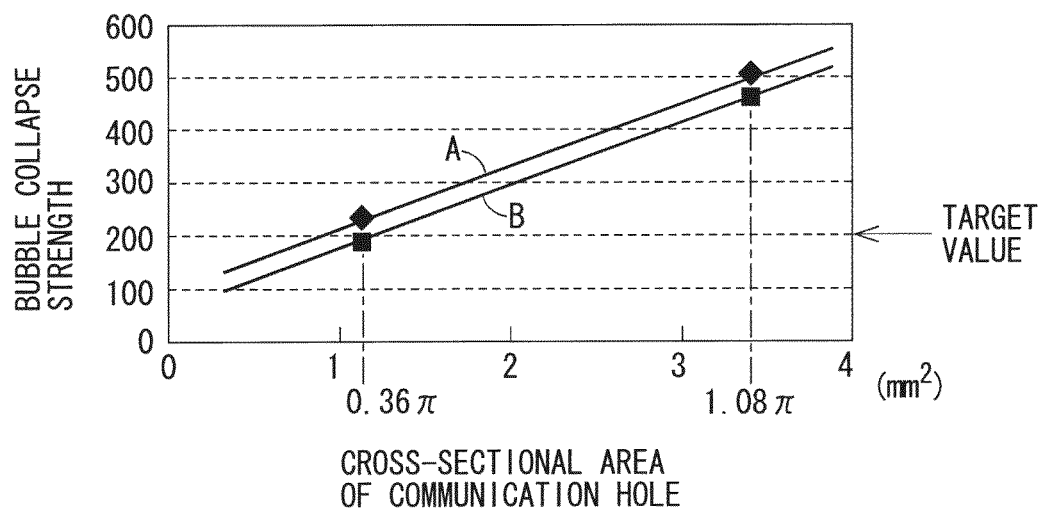
FIG. 6 is a graph showing a relationship between a cross-sectional area of a communication hole and the bubble collapse strength in the final gap.

A solid line "A" in FIG. 6 shows a case where the movable core 12 has four breathing ports 29. An inner diameter of each breathing port 29 is 1 mm and a total cross area of the breathing ports 29 is about 3.14 mm$^2$. A solid line "B" in FIG. 6 shows a case where the movable core 12 has six breathing ports 29. An inner diameter of each breathing port 29 is 1 mm and a total cross area of the breathing ports 29 is about 4.71 mm$^2$.

In a case that a target value of the bubble collapse strength is established less than 200, the target value can be obtained when a total cross-sectional area of the breathing ports 29 is about 4.71 mm$^2$, and a cross-sectional area of the communication hole 25 is 0.36 πmm$^2$ (about 1.13 mm$^2$) or less. When the cross-sectional area of the communication hole 25 is 0.36 πmm$^2$, the needle guide 16 has only one communication hole 25 of which inner diameter is 1.2 mm or less.

Meanwhile, when the cross-sectional area of the breathing ports 29 is made larger, the bubble collapse strength became smaller. However, this effect is smaller than a case in which the cross-sectional area of the communication hole 25 is varied.

Figure 7A:
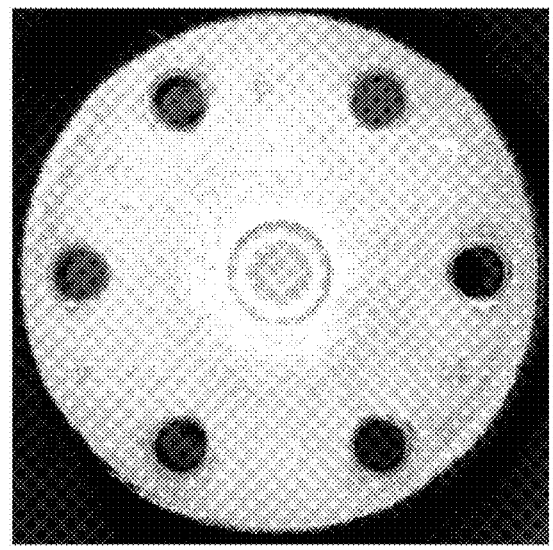
FIGS. 7A and 7B are photographs respectively showing a condition of a surface of the movable core.
Figure 7B:
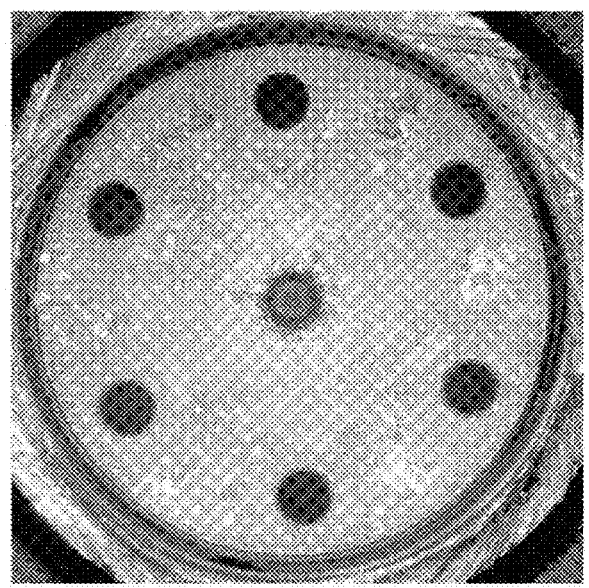

FIGS. 7A and 7B respectively show the condition of the end surface of the movable core 12 after the high-pressure pump 1 has been driven for a specified time period.

FIG. 7A shows the condition of a case in which the needle guide 16 has one communication hole 25 of which inner diameter is 1.2 mm.

FIG. 7B shows the condition of a case in which the needle guide 16 has three communication holes 25 of which inner diameter is 1.2 mm.

This experiment is conducted under the following conditions:

Fuel pressure: 20 MPa,
Fuel: Gasoline,
Cam mountain: Four cam mountains of 4 mm height,
Engine speed: 3500 rpm,
Discharge amount of High-pressure-pump: Full discharge,
Experiment Time: 180 H (3.7×10$^8$ times),
Final gap: 0.1 mm,
Breathing port: Six breathing ports (4.71 mm$^2$)

According to the above experimental result, it becomes apparent that the erosion at the end surface of the fixed core 11 is more restricted when the cross-sectional area of the communication hole 25 of a needle guide 16 is made smaller.

(Reduction of Noise Vibration)

A noise vibration of the high-pressure pump will be described, hereinafter.

Figure 8:
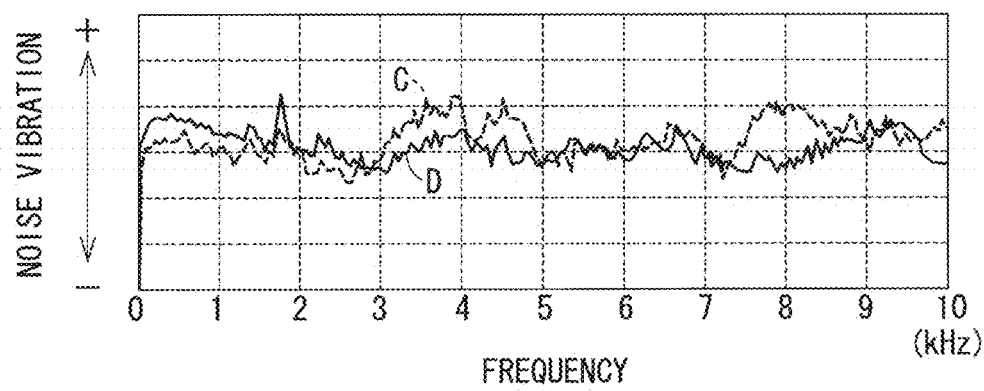
FIG. 8 is a graph showing frequency characteristics of sound generated from a solenoid valve of the first embodiment and a solenoid valve of a comparative example.

FIG. 8 is a graph showing frequency characteristics of noise generated by the high-pressure pump of the first embodiment and the high-pressure pump of the comparative example. As above-mentioned, the high-pressure pump of the first embodiment is an "air gap type", and the high-pressure pump of a comparative example is a "solid gap type." According to the first embodiment, as shown in FIGS. 8 and 10 to 13, the high-pressure pump 1 has three communication holes 25 of which inner diameter is 1.2 nm.

Meanwhile, the high-pressure pump of the comparative example shown in FIG. 15 has a solenoid valve.

A dashed line "C" in FIG. 8 shows the frequency characteristics of the noise generated by the high-pressure pump of the first embodiment. A solid line "D" shows the frequency characteristics of the noise generated by the high-pressure pump of the comparative example.

In the high-pressure pump of the first embodiment, the noise of which frequency is around 3 to 5 kHz and 7 to 9 kHz is high.

FIG. 9 is a graph showing a sound pressure level of suction-valve-closing noise generated when the coil is energized in the high-pressure pump of the comparative example. FIG. 10 is a graph showing a sound pressure level of suction-valve-closing noise generated when the coil is energized in the high-pressure pump of the first embodiment. The sound pressure level of the comparative example is quickly attenuated as shown by an arrow "E" in FIG. 9. Meanwhile, the sound pressure level of the first embodiment is slowly attenuated as shown by an arrow "F" in FIG. 10.

Figure 11:
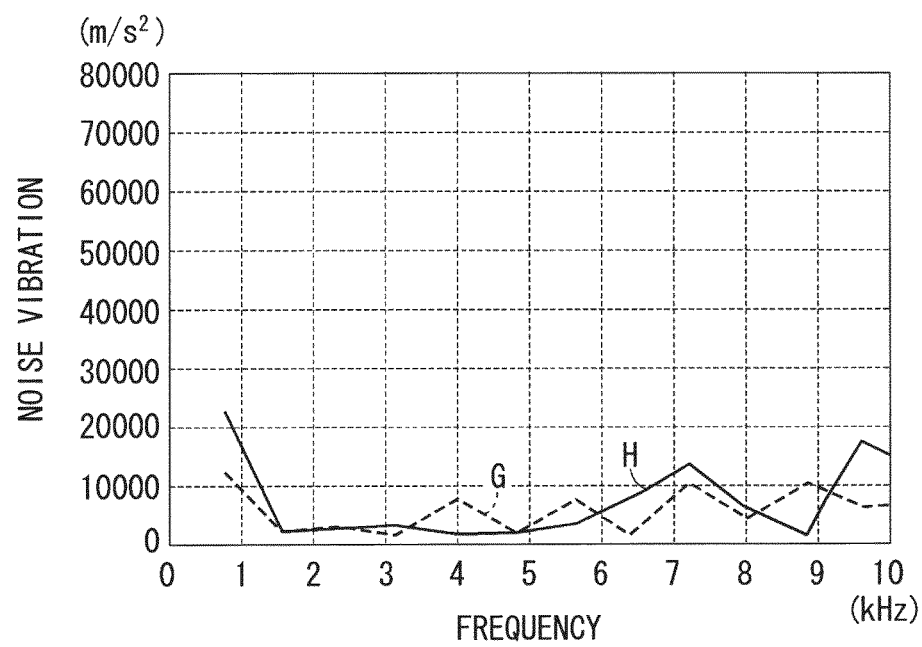
FIG. 11 is a graph showing frequency characteristics in a collision region of a solenoid valve of the first embodiment and a solenoid valve of a comparative example.

The frequency characteristics in a collision region (0.010 to 0.012 sec) of FIGS. 9 and 10 are shown in FIG. 11. A dashed line "G" shows the frequency characteristics in the collision region of the first embodiment. A solid line "H" shows the frequency characteristics in the collision region of the comparative example. As a result, there is no significant difference in frequency characteristics in the collision region between the comparative example and the first embodiment.

Figure 12:
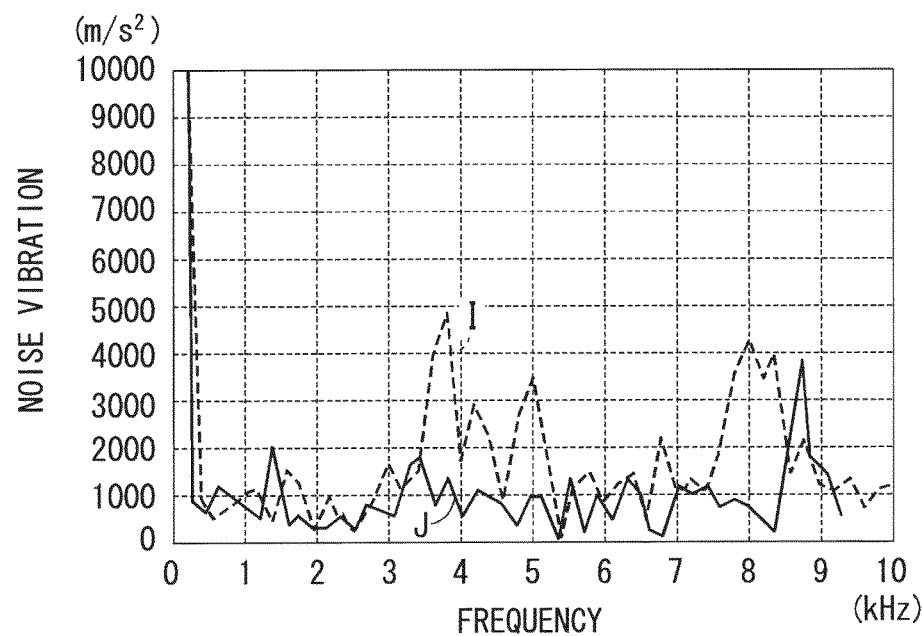
FIG. 12 is a graph showing frequency characteristics in an attenuation region of a solenoid valve of the first embodiment and a solenoid valve of a comparative example.

The frequency characteristics in an attenuation region (0.012 to 0.018 sec) of FIGS. 9 and 10 are shown in FIG. 12. A dashed line "I" shows the frequency characteristics in the attenuation region of the first embodiment. A solid line "J" shows the frequency characteristics in the attenuation region of the comparative example. As the result, in the high-pressure pump of the first embodiment, the noise of which frequency is around 3 to 5 kHz and 7 to 9 kHz is high. The deterioration in frequency characteristics of the high-pressure pump of the first embodiment, which is shown in FIG. 8, is caused due to a deterioration in frequency characteristics of valve-close noise of the suction valve in the attenuation region (0.012 to 0.018 sec).

Figure 13:
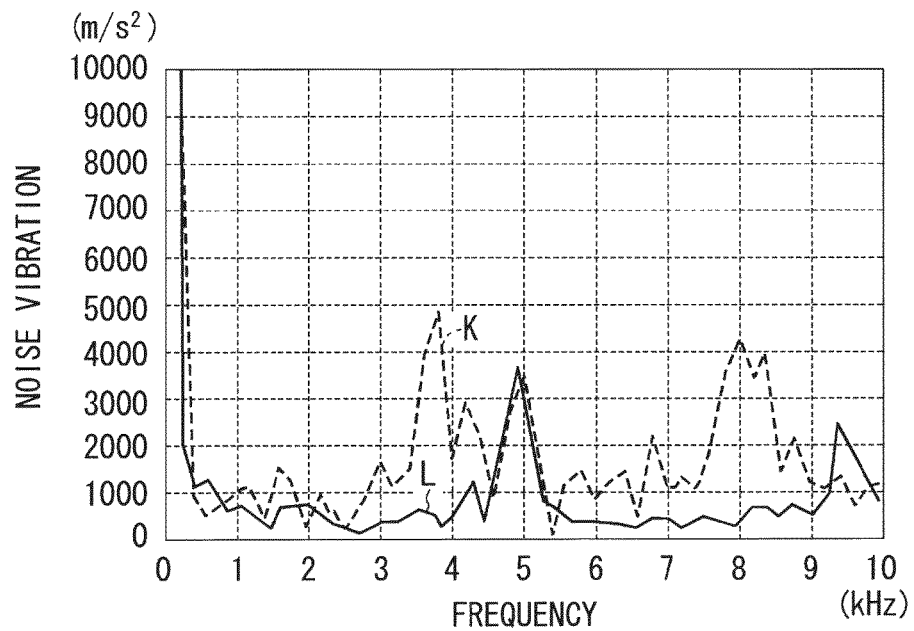
FIG. 13 is a graph showing noise frequency characteristics of when the cross-sectional area of the communication hole is varied in the high-pressure pump of the first embodiment.

FIG. 13 is a graph showing noise frequency characteristics of when the cross-sectional area of the communication hole 25 of the needle guide 16 is varied in the high-pressure pump of the first embodiment. A dashed line "K" in FIG. 13 represents the frequency characteristics of valve-close noise in the attenuation region (0.012 to 0.018 sec) in a case where the needle guide 16 has three communication holes 25 of which inner diameter is 1.2 mm. The dashed line "K" in FIG. 13 is identical to the dashed line "I" in FIG. 12. A solid line "L" in FIG. 13 represents the frequency characteristics of valve-close noise in the attenuation region (0.012 to 0.018 sec) in a case where the needle guide 16 has only one communication hole 25 of which inner diameter is 1.2 mm. As a result, it becomes apparent that the noise of which frequency is about 3 to 5 kHz and 6 to 9 kHz is reduced in a case that the needle guide 16 has only one communication hole 25 of which inner diameter is 1.2 mm.

Figure 14:
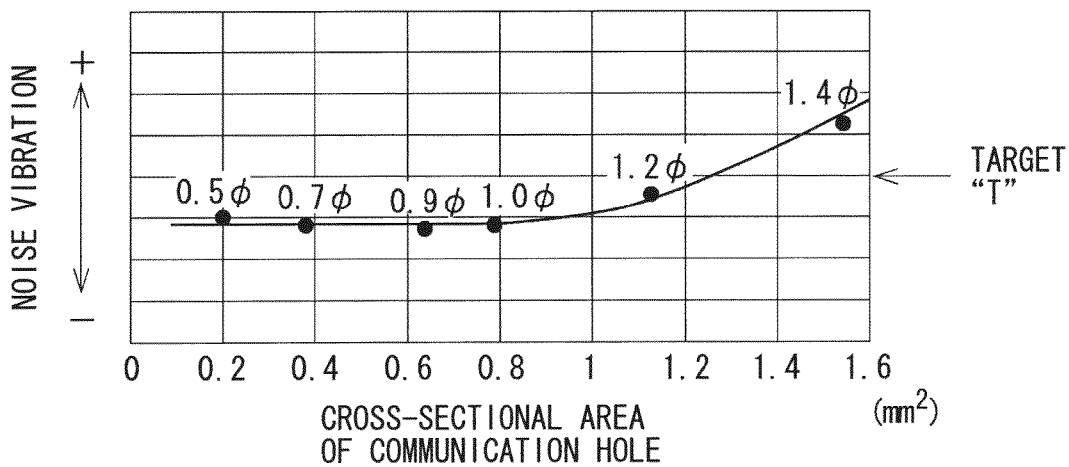
FIG. 14 is a graph showing overall values of 0 to 10 kHz of when the cross-sectional area of the communication hole is varied in the high-pressure pump of the first embodiment.

FIG. 14 is a chart showing overall values of the noise vibration of which frequency is 0 to 10 kHz. The noise vibration is generated when a cross-sectional area of the communication hole 25 is varied in a case that the needle guide 16 has only one communication hole 25.

In a case that a target value of the overall value of noise vibration is set as "T", the overall value can be made lower than or equal to "T" when the needle guide 16 has only one communication hole 25 of which inner diameter is 1.2 mm. Preferably, when the needle guide 16 has only one communication hole 25 of which inner diameter is 1.0 mm or less, the overall value of the noise vibration can be further decreased.

Advantages of the First Embodiment

According to the above first embodiment, following functional advantages can be achieved.

(1) The opening sectional area of the communication hole 25 is defined in such a manner as to reduce an erosion on an end surface of the movable core 12 or the fixed core 11. Specifically, the opening sectional area of the communication hole 25 is larger than zero and is less than or equal to 0.36 $\pi mm^2$. That is, the opening sectional area of the communication hole 25 is larger than 0% and less than or equal to 1.69% relative to a cross sectional area which is obtained by subtracting the cross-sectional area of the needle 26 from the cross-sectional area of the movable core 12.

According to the above configuration, a fluid acceleration of the fuel flowing into the movable core chamber 2 through the fuel supply passage 48 and the communication hole 25 is reduced. Therefore, the fluid acceleration of the fuel flowing from the movable core chamber 24 into the gap between the movable core 12 and the fixed core 11 through the breathing ports 29 is reduced. Since the bubble collapse strength in the gap between the movable core 12 and the fixed core 11 becomes smaller, the erosion on the end surfaces of the movable core 12 and the fixed core 11 can be restricted. As a result, the deterioration in magnetic attraction force between the movable core 12 and the fixed core 11 can be restricted. The discharging efficiency of the high-pressure pump 1 can be maintained.

(2) In the first embodiment, when the movable core 12 is magnetically attracted toward the fixed core 11, the enlarged portion 27 and the needle guide 16 are brought into contact with each other and the final gap is defined between the movable core 12 and the fixed core 11. Thereby, it can be restricted that bubbles in the fuel in the final gap are collapsed.

(3) In the first embodiment, the volume of the final gap between the movable core 12 and the fixed core 11 is established in such a manner that the erosion on the end surfaces of the movable core 12 and the fixed core 11 is reduced and the magnetic attraction force between the movable core 12 and the fixed core 11 is maintained. Specifically, when the final gap is defined, a distance between the fixed core 11 and the movable core 12 is 0.08-0.16 mm. When the outer diameter of the movable core 12 is 9.7 mm, the volume of the final gap is 1.8818 $\pi mm^3$ to 3.7636 $\pi mm^3$. The outer diameter of the movable core 12 is not limited to the above value.

Thus, the erosion on the end surface of the movable core 12 can be restricted.

(4) A noise vibration is generated due to a contact between the enlarged portion 27 and the needle guide 16 when the coil 13 intermittently is energized. In the first embodiment, the opening sectional area of the communication hole 25 is defined in such a manner that the noise vibration is reduced. Specifically, the opening sectional area of the communication hole 25 is 0.36 $\pi mm^2$ or less. Preferably, the opening sectional area is 0.25 πmm² or less. Thereby, the noise of a specified frequency can be reduced. The noise vibration of the solenoid valve 10 can be reduced.

(5) In first embodiment, the needle guide 16 has only one communication hole 25 and its inner diameter is 1.2 mm or less, preferably 1.0 mm or less. Thereby, it can be restricted that the erosion occurs on the end surfaces of the fixed core 11 and the movable core 12. Also, the noise vibration of the solenoid valve 10 can be reduced.

(6) In first embodiment, the second spring 14 is arranged between the flange 28 of the needle 26 and the needle guide 16.

As the comparative high-pressure pump 2 shown in FIG. 15, in a case that a spring-accommodating chamber 4 is defined between the movable core 12 and the fixed core 11 to accommodate the second spring 14 therein, it is likely that an erosion may occur on an inner wall surface of the spring-accommodating chamber 4.

Meanwhile, according to the first embodiment, the second spring 14 is arranged in the fuel supply passage 48, whereby it is avoided that an erosion occurs.

(7) The communication hole 25 is comprised of the large-diameter hole 251 and a small-diameter hole 252.

Generally, a precision processing is necessary to form a small-diameter hole, which may increase a manufacturing cost. According to the first embodiment, since the communication hole 25 is comprised of the large-diameter hole 251 and the small-diameter hole 252, a relative length of the small-diameter hole 252 in the communication hole 25 can be made smaller. Thus, the manufacturing cost can be reduced.

(8) The large-diameter hole 251 is formed on an end surface confronting to the movable core chamber 24. The small-diameter hole 252 is formed on the other end surface confronting to the fuel supply passage 48. Thus, the area of the other end surface on which a valve seat is formed is not reduced excessively, whereby the second spring 14 is certainly brought into contact with the needle guide 16. Also, it is avoided that the second spring 14 is inclined.

Second Embodiment

Referring to FIGS. 16 to 20, a second embodiment will be described. In the second embodiment, the substantially same parts and the components as those in the first embodiment are indicated with the same reference numeral and the same description will not be reiterated.

(Configuration of High-Pressure Pump)

A high-pressure pump is an "air gap type" pump as well as the first embodiment. In the air gap type pump, the movable core 12 and the fixed core 11 are not brought into contact with each other. Moreover, an outer diameter of the movable core 12 is 9.57 mm, and an outer diameter of the needle 26 is 3.3 mm.

Figure 16:
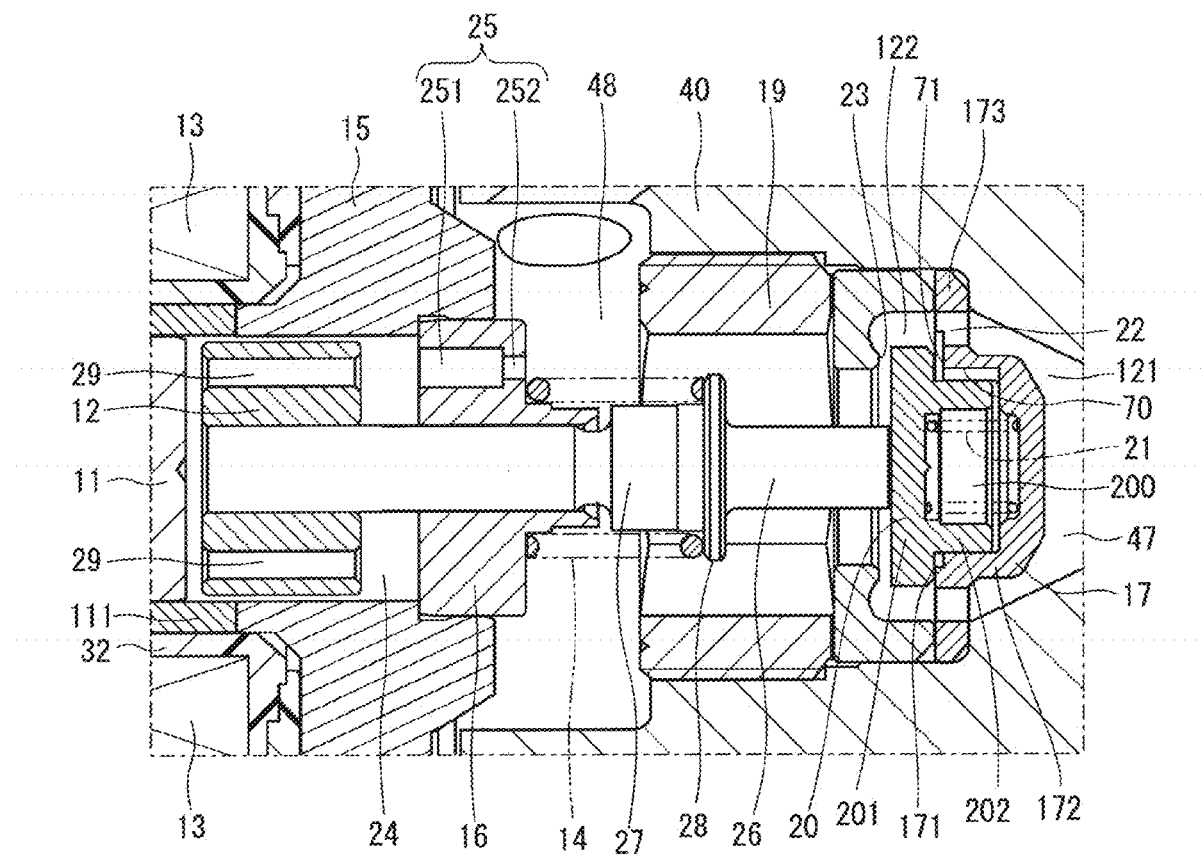
FIG. 16 is a cross-sectional view showing an essential part of a high-pressure pump according to a second embodiment.

Referring to FIG. 16, configurations of the suction valve 20 and the stopper 17 will be explained in detail.

The suction valve 20 is provided with a valve body 201 and a first guide portion 202. The valve body 201 is disk-shaped and is capable of sitting on or being apart from the valve seat 23 of the seat member 18. The suction valve 20 is brought into contact with a contacting portion 171 of the stopper 17 at its end surface opposite to the valve seat 23. Accordingly, a movement of the suction valve 20 in a valve-open direction is restricted.

The first guide portion 202 is cylindrical-shaped and extends from the valve body 201 in a direction opposite to the valve seat 23. An outer peripheral surface of the first guide portion 202 is slidably in contact with an inner peripheral surface of the second guide portion 172 of the stopper 17. The first guide portion 202 of the suction valve 20 is guided by the second guide portion 172 of the stopper 17, whereby the suction valve 20 certainly sits on or moves away from the valve seat 23.

The stopper 17 has the contacting portion 171, the second guide portion 172, a fixed portion 173, and the aperture 22. The contacting portion 171 of the stopper 17 is ring-shaped and is brought into contact with an end surface of the valve body 201. The second guide portion 172 of the stopper 17 is cylindrical-shaped and extends from the contacting portion 171 in a direction opposite to the valve seat 23. The second guide portion 172 is slidably in contact with an outer peripheral surface of the first guide portion 202. The fixed portion 173 of the stopper 17 radially outwardly extends from the contacting portion 171 to be fixed on an inner wall of the fuel supply passage 48. The fixed portion 173 divides the pump chamber 47 into a plunger chamber 121 and a valve seat chamber 122.

The fixed portion 173 of the stopper 17 has multiple apertures 22. Specifically, twelve apertures 22 are circumferentially arranged in the fixed portion 173 to fluidly connect the plunger chamber 121 and the valve seat chamber 122. The second guide portion 172 of the stopper 17 has four axial grooves 70 on its inner wall surface. The four axial grooves 70 are circumferentially arranged at a regular interval. The contacting portion 171 of the stopper 17 has four radial grooves 71 circumferentially. The radial grooves 71 fluidly connect the axial grooves 70 and the apertures 22.

A valve chamber 200 accommodating the first spring 21 is defined between the suction valve 20 and the stopper 17. The pump chamber 47 and the valve chamber 200 communicate with each other through the radial grooves 71, the axial grooves 70 and a clearance between the first guide portion 202 and the second guide portion 172.

According to the second embodiment, the radial grooves 71 and the axial grooves 70 correspond to "a passage fluidly connecting the valve chamber and the pump chamber". It should be noted that a total passage sectional area of the four radial grooves 71 is smaller than an area which is obtained by adding the passage sectional area of four axial grooves 70 and the passage sectional area of the clearance between the first guide portion 202 and the second guide portion 172.

Thus, when the suction valve 20 is opened, the flow rate of the fuel flowing between the valve chamber 200 and the pump chamber 47 depends on the passage sectional area of the four radial grooves 71. In a metering stroke of the high-pressure pump, the fuel flow into the valve chamber 200 is restricted by decreasing the passage sectional area of the radial grooves 71, whereby an excessive pressure increase in the valve chamber 200 is restricted, so that a self-close limit speed can be made higher. It should be noted that the self-close limit speed represents a rotating speed of a cam shaft of when the suction valve 20 is closed due to a fuel pressure in the valve chamber 200 or a dynamic pressure of the fuel flowing into the fuel supply passage 48 from the pump chamber 47 in the metering stroke of the high-pressure pump.

When the suction valve 20 is closed, the end surface of the valve body 201 is apart from the contacting portion 171 of the stopper 17. The flow rate of the fuel flowing into the pump chamber 47 from the valve chamber 200 depends on a total area of the passage sectional area of four axial grooves 70 and the passage sectional area of the clearance between the first guide portion 202 and the second guide portion 172. Thus, by increasing the passage sectional area of four axial grooves 70, the fuel flows into the pump chamber 47 from the valve chamber 200 in a suction stroke of the high-pressure pump. A suction efficiency of the fuel can be enhanced without a situation where the fuel in the valve chamber 200 becomes fluid resistance. That is, since the suction efficiency of the high-pressure pump in the second embodiment is higher than that in the first embodiment, a fuel discharged amount can be increased.

(Opening Sectional Area of Communication Hole)

The opening sectional area of the communication hole 25 will be explained hereinafter.

In the high-pressure pump of the second embodiment, the opening sectional area of the communication hole 25 is defined in such a manner that a relationship between an energization period of the coil 13 and the fuel discharged amount is maintained.

Figure 17:
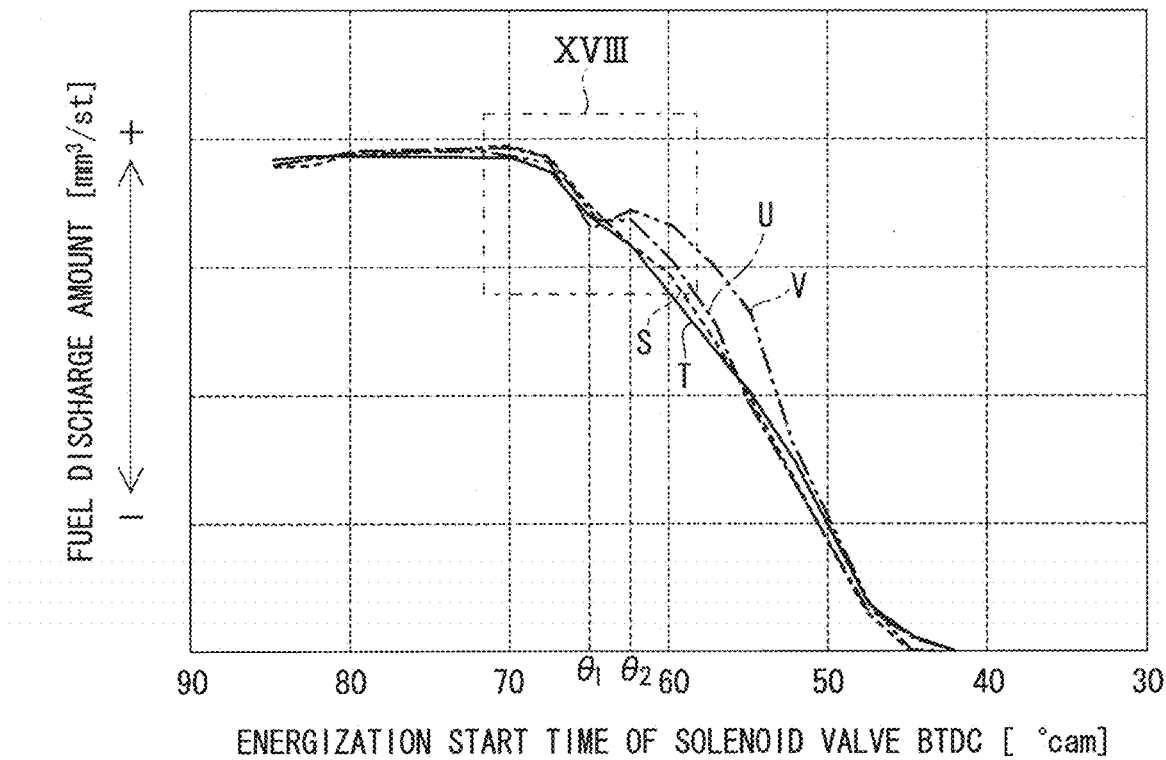
FIG. 17 is a graph showing a relationship between an energization start time of a solenoid valve and a fuel discharge amount of a high-pressure pump.

FIG. 17 is a graph showing the relationship between the energization period of the coil 13 and the fuel discharged amount while an inner diameter of the communication hole 25 is varied. In the following descriptions, the inner diameter of the communication hole 25 represents an inner diameter of the small-diameter hole 252.

In FIG. 17, a dashed line "S" shows a case where the inner diameter of the communication hole 25 is 0.4 mm, a solid line "T" shows a case where the inner diameter of the communication hole 25 is 0.5 mm, a long dashed short dashed line "U" shows a case where the inner diameter of the communication hole 25 is 0.6 mm, and an two-dot chain line "V" shows a case where the inner diameter of the communication hole 25 is 0.9 mm.

Generally, in a high-pressure pump, when a force with which the needle 26 pushes the suction valve 26 is canceled in a metering stroke, the suction valve 20 sits on the valve seat 23 to start the discharging stroke. Thus, as the energization start time of the coil 13 is delayed, the discharge stroke start time is more delayed so that the fuel discharged amount is decreased. It is preferable that such a relationship is maintained in order to control the fuel discharged amount of the high-pressure pump.

However, in the cases indicated by the long dashed short dashed line "U" and the two-dot chain line "V", during an energization period of the coil 13 from BTDC θ1 to BTDC θ2, as the energization start time of the coil 13 is delayed, the fuel discharged amount is more increased.

Meanwhile, in the cases indicated by the dashed line "S" and the solid line "T", as the energization start time of the coil 13 is delayed, the fuel discharged amount is more decreased.

Figure 18:
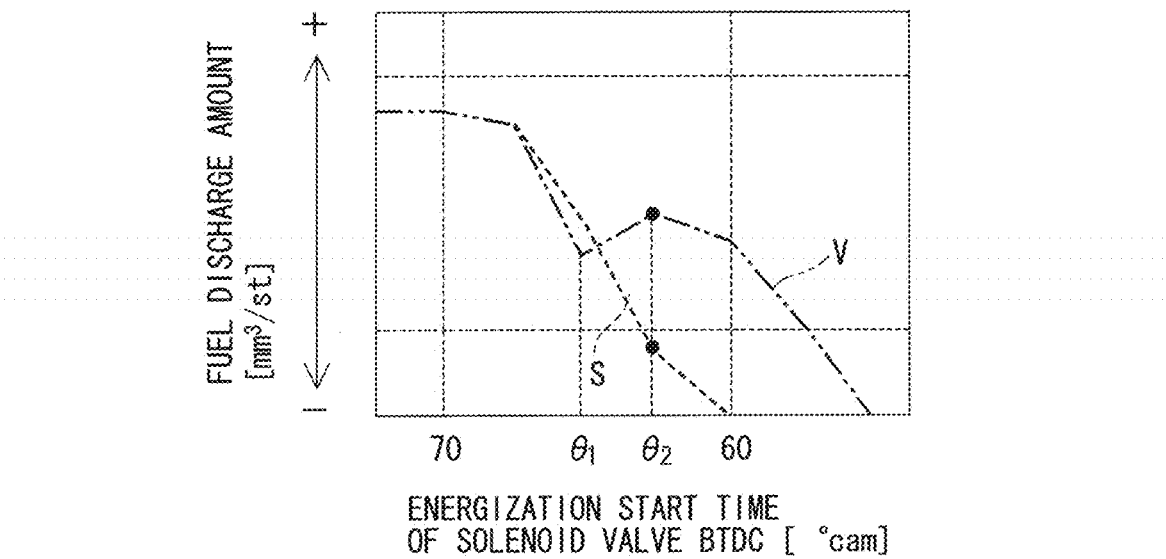
FIG. 18 is an enlarged view of part XVIII in FIG. 17.

FIG. 18 is an enlarged view of XVIII portion in FIG. 17. FIG. 18 shows only cases indicated by the two-dot chain line "V" and the dashed line "S".

During an energization period of the coil 13 from BTDC 70 to BTDC θ1, in both cases indicated by lines "V" and "S", as the energization start time of the coil 13 is delayed, the fuel discharged amount is more decreased.

During an energization period of the coil 13 from BTDC θ1 to BTDC θ2, in the case indicated by line "V", as the energization start time of the coil 13 is delayed, the fuel discharged amount is not decreased. The reason of the above will be explained with reference to FIGS. 19A to 19C.

Figure 19A:
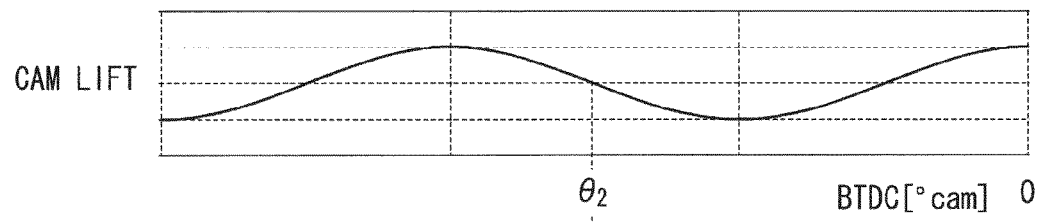
FIGS. 19A to 19C are charts showing a relationship between an inner diameter of a communication hole and a behavior of a needle.
Figure 19B:
Figure 19C:
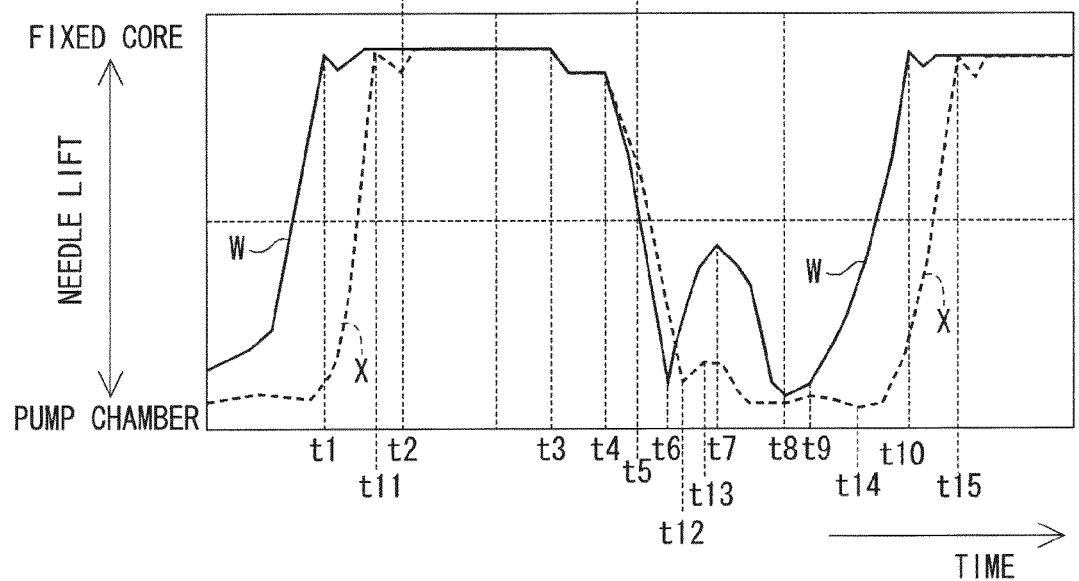

FIG. 19A shows a cam lift of the camshaft. FIG. 19B is a time chart showing an energization period of the coil 13 in a case where the coil 13 is energized at BTDC θ2. FIG. 19C is a chart showing a behavior of the needle 26 in a case where the coil 13 is energized at BTDC θ2. A solid line "W" shows the behavior of the needle 26 in a case where the inner diameter of the communication hole 25 is 0.9 mm. A dashed line "X" shows the behavior of the needle 26 in a case where the inner diameter of the communication hole 25 is 0.4 mm.

First, based on the solid line "W", the behavior of the needle 26 will be explained. At a time t1, the movable core 12 is magnetically attracted toward the fixed core 11, and the needle 26 is positioned close to the fixed core 11. At this time, as shown in FIG. 19A, the plunger 42 slides up along with the cam and the high-pressure pump starts the discharging stroke.

When the coil 13 is deenergized at a time t2, the magnetic attraction force is extinguished. After a time t3, the needle 26 moves toward the pump chamber 47 and is brought into contact with the suction valve 20. It should be noted that a time period from the time t2 to the time t3 corresponds to a time delay after the coil 13 is deenergized until the needle 26 starts moving.

After a time t4, the plunger 42 slides down, so that the pump chamber 47 is decompressed. The suction valve 20 and the needle 26 move toward the pump chamber 47. When the inner diameter of the communication hole 25 is larger, the flow resistance of the fuel flowing between the movable core chamber 24 and the fuel supply passage 48 will become smaller. Thus, in a case shown by the solid line "W", the needle 26 moves toward the pump chamber 47 at the time t6, and then the needle 26 and the movable core 12 bounce toward the fixed core 11. At a time t7, the needle 26 bounces to a position which is close to a half position of a maximum needle lift quantity. After a time t8, the plunger 42 slides up and a metering stroke is started. When the coil 13 is energized at BTDC θ2, that is, at the time t5, a magnetic attraction force acts on the movable core 12 after a specified time delay. At a time t9, the needle 26 starts moving toward the fixed core 11. The needle 26 is positioned most close to the fixed core 11 at a time t10. Thereby, a fuel discharging stroke is started.

Next, based on the dashed line "X", the behavior of the needle 26 will be explained. The needle 26 is positioned most close to the fixed core side 11 at a time t11. Then, the high-pressure pump starts the discharging stroke. When the coil 13 is deenergized at the time t2, the magnetic attraction force is extinguished. After the time t3, the needle 26 moves toward the pump chamber 47 and is brought into contact with the suction valve 20. When the pump chamber 47 is decompressed, the suction valve 20 and the needle 26 move toward the pump chamber 47. When the inner diameter of the communication hole 25 is smaller, the flow resistance of the fuel flowing between the movable core chamber 24 and the fuel supply passage 48 will become larger. Thus, in the case shown by the dashed line "X", a bounce amount of the needle 26, which has moved toward the pump chamber 47 at the time t12, is small. The needle 26 slightly bounces at the time t13. After that, the needle 26 has been positioned in the pump chamber 47. After a time t8, the plunger 42 slides up and a metering stroke is started. When the coil 13 is energized at BTDC θ2, that is, at the time t5, a magnetic attraction force acts on the movable core 12 after a specified time delay. After the time t14, the needle 26 starts moving toward the fixed core 11. At the time t15, the needle 26 is positioned most close to the fixed core 11. Thereby, a fuel discharging stroke is started.

As explained above with reference to FIG. 19, in a case where the inner diameter of the communication hole 25 is 0.9 mm, the needle 26 which has moved to the pump chamber 47 makes a large bounce with the movable core 12. Therefore, when the coil 13 is energized at BTDC θ2, the magnetic attraction force acts on the movable core 12 after a specified time delay. While the needle 26 is bouncing, the needle 26 starts moving toward the fixed core 11. A start time of the fuel discharging stroke is made earlier than intended, whereby the fuel discharged amount is increased.

Meanwhile, in a case that the inner diameter of the communication hole 25 is 0.4 mm, the needle 26 which has moved toward the pump chamber 47 slightly bounces and then the needle 26 is positioned most close to the pump chamber 47. When the coil 13 is energized at BTDC θ2 and the magnetic attraction force acts on the movable core 12, the needle 26 starts moving from the pump chamber 47 toward the fixed core 11. Therefore, since the fuel discharging stroke is started at normal time, the fuel discharged amount is not increased.

Figure 20:
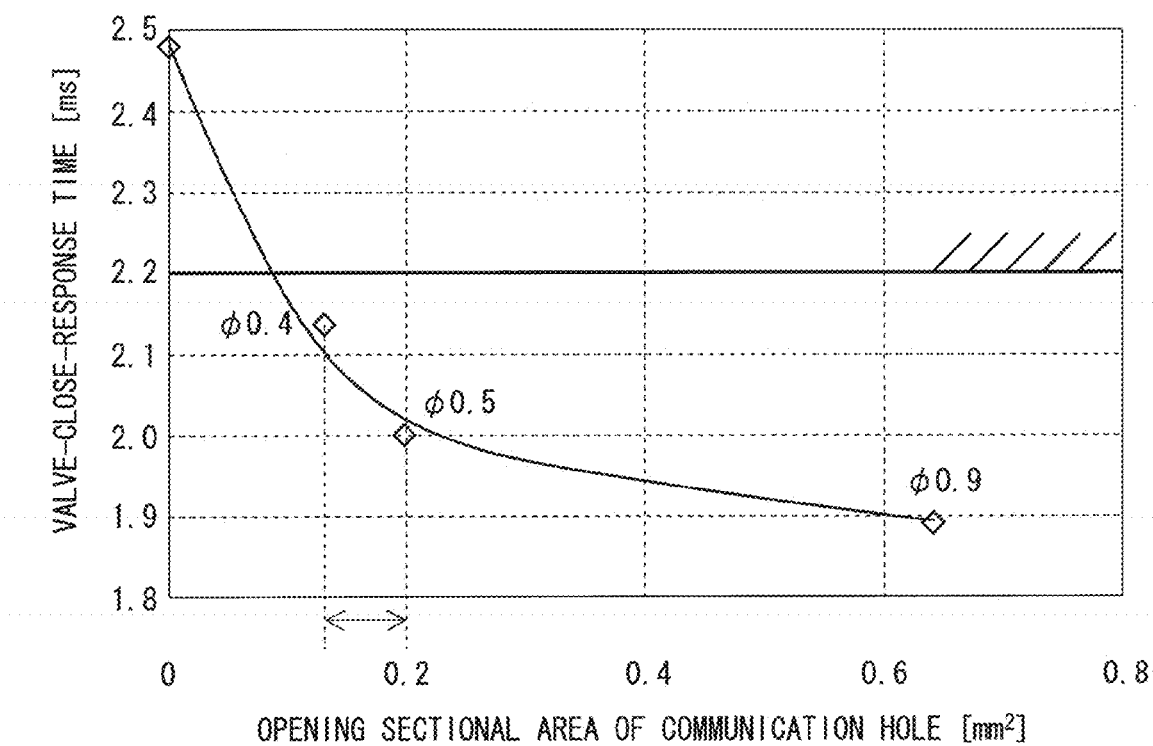
FIG. 20 is a graph showing a relationship between an opening sectional area of a communication hole and a valve-close-response time of a suction valve.

FIG. 20 is a graph showing a relationship between the opening sectional area (mm$^2$) of the communication hole 25 and a valve-close-response time (ms) of the suction valve 20.

When the opening sectional area of the communication hole 25 is made smaller, the flow resistance of the fuel flowing between the movable core chamber 24 and the fuel supply passage 48 becomes larger. Thus, a time delay between the coil energization and the needle moving becomes larger.

When the rotating speed of a cam shaft is 4000 rpm and the valve-close-response time becomes greater than or equal to 2.2 ms, it will become difficult to control of the fuel pump. Moreover, if the inner diameter of a communication hole 25 is less than 0.4 mm, it will become difficult to form the communication hole 25 by machining. Therefore, the inner diameter of a communication hole 25 is greater than or equal to 0.4 mm.

Also, as shown in FIG. 17, in a case that the inner diameter of the communication hole 25 is less than or equal to 0.5 mm, the fuel discharged amount is more decreased as the energization start time of the coil 13 is more delayed. Therefore, it is preferable that the inner diameter of a communication hole 25 is 0.4 mm to 0.5 mm.

At this time, the opening sectional area of the communication hole 25 is 0.20% to 0.31% relative to a cross-sectional area of the movable core 12 from which the cross-sectional area of the needle 26 is removed.

According to the above second embodiment, following functional advantages can be achieved.

(1) In second embodiment, the inner diameter of the communication hole 25 is defined in such a manner that the starting time of the metering stroke is delayed and the fuel discharged amount is more decreased as the energization start time of the coil 13 is more delayed. Specifically, the inner diameter of a communication hole 25 is 0.5 mm or less. That is, the opening sectional area of the communication hole 25 is 0% to 0.31% relative to the cross-sectional area of the movable core 12 from which the cross-sectional area of the needle 26 is removed.

Thereby, in the suction stroke, it is restricted that the movable core 12 and the needle 26 bounce toward the fixed core 11 after the needle 26 biases the suction valve 20 toward the stopper by means of a biasing force of the second spring 14. Therefore, the relationship between the energization start time of the coil 13 and the fuel discharged amount is properly maintained, so that the fuel discharged amount of the high-pressure pump can be controlled correctly.

(2) The opening sectional area of the communication hole 25 is 0.20% or more relative to the cross-sectional area of the movable core 12 from which the cross-sectional area of the needle 26 is removed. Thereby, the valve-close-response time of the suction valve 20 becomes shorter, and the high-pressure pump can be well controlled even when the cam shaft rotates at high speed.

(3) The opening sectional area of the communication hole 25 is 0.4 mm$^2$ or more. Thereby, the communication hole 25 of the needle guide 16 can be formed by machining, so that its manufacturing cost can be reduced.

(4) The pump chamber 47 and the valve chamber 200 communicate with each other through the radial grooves 71 and the axial grooves 70. The passage sectional area of the radial grooves 71 is smaller than the passage sectional area of the axial grooves 70. Thereby, when the suction valve 20 starts moving from the valve-close position to the valve-open position immediately after the suction stroke is started, the fuel flows from the valve chamber 200 to the pump chamber 47 without receiving a flow resistance of the fuel in the valve chamber 200. A valve open speed of the suction valve 20 is enhanced. As a result, the suction efficiency of the fuel from the fuel supply passage 48 to the pump chamber 47 can be enhanced.

Meanwhile, in the metering stroke, since the fuel flowing into the valve chamber 200 from a pump chamber 47 is restricted, a fuel pressure increase in the valve chamber 200 is restricted and the self-close limit speed can be made higher.

Both the suction efficiency and the self-close limit speed are improved. The fuel discharged amount of the high-pressure pump can be surely controlled even when the engine speed is increased and a reciprocating speed of the plunger 42 is increased.

Other Embodiment

In the above embodiments, the solenoid valve 10 is a normally opened valve which is opened when the coil 13 is not energized. Meanwhile, the solenoid valve 10 may be a normally closed valve which is closed when the coil 13 is not energized.

In the above embodiments, the suction valve 20 and the needle 26 are formed independently. Meanwhile, the suction valve 20 and the needle 26 may be formed integrally from one piece.

In the second embodiment mentioned above, the radial grooves 71 are formed on the contacting portion 171 of the stopper 17, and the axial grooves 70 are formed on the second guide portion 172 of the stopper 17. Meanwhile, the radial grooves 71 may be formed on an end surface of the suction valve, which is opposite to the valve seat. The axial grooves 70 may be formed on the first guide portion 202 of a suction valve 20. Moreover, an orifice may be provided at a sliding portion between the first guide portion 202 and the second guide portion 172.

The present invention is not limited to the embodiments mentioned above, and can be applied to various embodiments.

What is claimed is:
1. A high-pressure pump comprising:
a plunger;
a pump chamber in which a fuel is pressurized along with a reciprocation of the plunger; a pump body defining a fuel supply passage through which the fuel is supplied to the pump chamber and a discharge passage through which the fuel pressurized in the pump chamber is discharged;
a suction valve which seals or unseals a valve seat formed on an inner wall surface of the fuel supply passage so that the pump chamber and the fuel supply passage are fluidly connected or disconnected with each other;
a stopper which restricts a movement of the suction valve in a valve-open direction;
a needle which is positioned opposite side of the pump chamber with respect to the suction valve in such a manner as to bias the suction valve in the valve-open direction;
a movable core which is fixed to an end portion of the needle opposite to the suction valve, the movable core being provided in a movable core chamber in such a manner as to reciprocate in a moving direction of the needle;

a fixed core which is positioned to an opposite side of the suction valve with respect to the movable core;

a coil which generates a magnetic attraction force between the fixed core and the movable core when energized;

a biasing portion which biases the movable core and the needle in the valve-open direction of the suction valve; and a needle guide which has a communication hole fluidly connecting the movable core chamber with the fuel supply passage, the needle guide defining the movable core chamber and the fuel supply passage, wherein an opening sectional area of the communication hole is defined so that a fuel discharged amount decreases relative to a maximum fuel discharge amount as an energization start time of the coil is delayed relative to the energization start time for the maximum fuel discharge amount when a biasing force of the needle to the suction valve is reduced while the plunger slides toward the pump chamber by energizing the coil, wherein:

the opening sectional area of the communication hole is greater than 0% and less than or equal to 0.31% of an area which is obtained by removing a cross-sectional area of the needle from a cross-sectional area of the movable core.

2. A high-pressure pump according to claim 1, wherein:
an inner diameter of the communication hole is greater than 0 mm and less than or equal to 0.5 mm.

3. A high-pressure pump according to claim 1, wherein:
an inner diameter of the communication hole is greater than or equal to 0.4 mm.

4. A high-pressure pump according to claim 1, wherein: an inner diameter of the communication hole is 1.00 mm or less and greater than or equal to 0.4 mm.

5. A high-pressure pump according to claim 4, wherein:
the passage fluidly connecting the pump chamber and the valve chamber is comprised of:
a radial groove formed on the contacting portion or the end surface of the valve body in such a manner as to communicate with the pump chamber; and
an axial groove formed on the first guide portion or the second guide portion in such a manner as to fluidly connect the valve chamber with the radial groove.

* * * * *